June 15, 1937.  C. H. GETZ  2,084,025
COVER FOR RUNNING BOARDS AND THE LIKE
Filed May 14, 1934   2 Sheets-Sheet 1
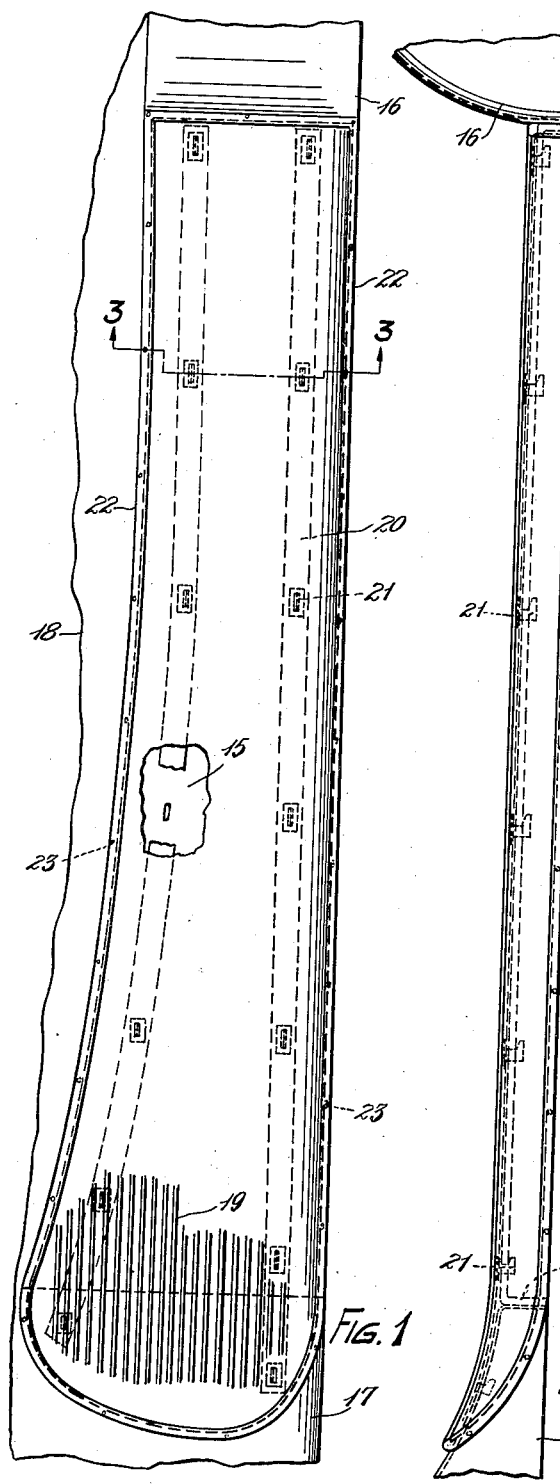
Fig. 1
Fig. 2
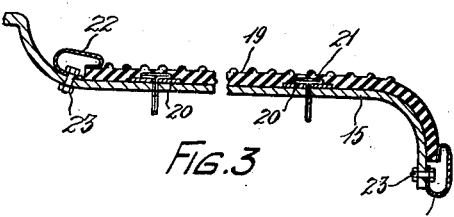
Fig. 3
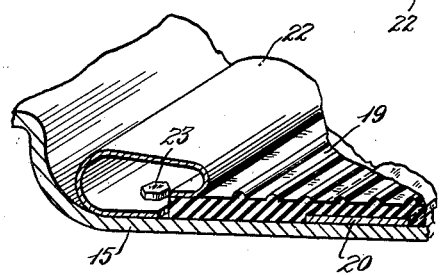
Fig. 4
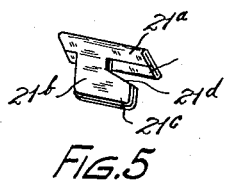
Fig. 5
Fig. 6
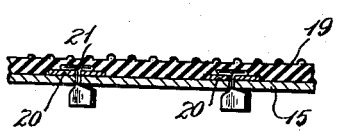
Fig. 7
INVENTOR
CHARLES H. GETZ
Kwis, Hudson & Kent
ATTORNEYS June 15, 1937.  C. H. GETZ  2,084,025
COVER FOR RUNNING BOARDS AND THE LIKE
Filed May 14, 1934  2 Sheets-Sheet 2
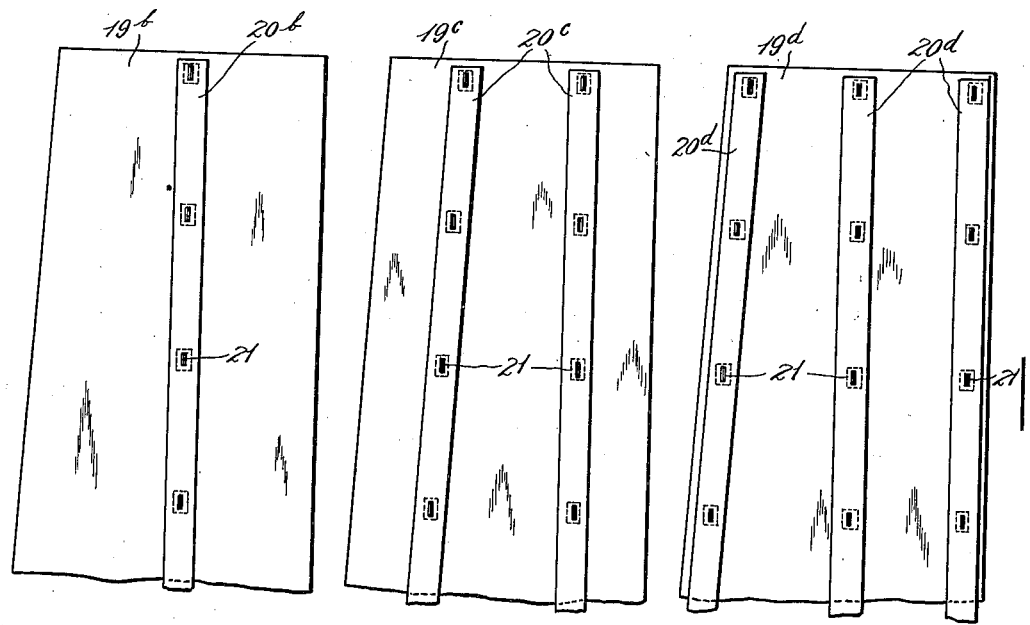
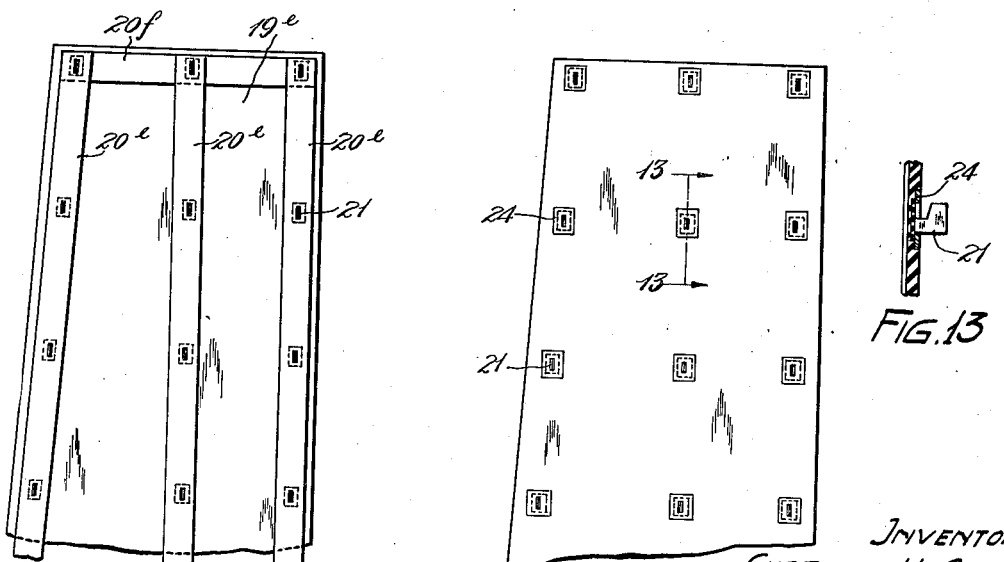
INVENTOR
CHARLES H. GETZ
ATTORNEYS Patented June 15, 1937

2,084,025

UNITED STATES PATENT OFFICE 2,084,025

COVER FOR RUNNING BOARDS AND THE LIKE

Charles H. Getz, East Cleveland, Ohio, assignor to The Ohio Rubber Company, Willoughby, Ohio, a corporation of Ohio Application May 14, 1934, Serial No. 725,537

8 Claims. (Cl. 280—169)

This invention relates to covers for automobile running boards and the like.

It has been customary practice in recent years, in fact almost universal practice, to cover automobile running boards with rubber which is vulcanized directly to the boards. The covering of running boards in this manner has proved to be very satisfactory in so far as permanence of attachment, wearing qualities, and appearance are concerned, but the recent stream-lining of automobiles has involved the use of deeply drawn and curved running boards, greatly increasing the cost of the molds used in vulcanizing the rubber to the running boards and in some instances making desirable the fastening of the covers to the running boards by mechanical fastening means.

The principal object of the present invention therefore is to provide a flexible cover molded from rubber or other suitable composition of a plastic nature and having provision for fastening or both reenforcing and fastening of such a nature that the cover can be made to conform to the irregular shape of the board and lie flat thereon over its entire area and be securely fastened thereto in a permanent manner.

The above and other objects are attained by the present invention which may be briefly summarized as consisting in certain novel details of construction and combinations and arrangements of parts which will be described in the specification and set forth in the appended claims.

In the accompanying sheets of drawings wherein I have illustrated different embodiments of the invention, Fig. 1 is a plan view of a cover applied to the running board of an automobile, showing the running board by dotted lines and portions of the fenders to which the ends of the running board are attached;

Fig. 2 is an edge view of the same;

Fig. 3 is an enlarged transverse sectional view substantially along the line 3—3 of Fig. 1, with a portion broken away;

Fig. 4 is an enlarged perspective view illustrating the manner in which the edge portion of the cover is secured to the running board;

Fig. 5 is a perspective view of a fastening clip which is preferably employed;

Fig. 6 is a fragmentary sectional view showing how an edge portion of the cover can be molded in curved form;

Fig. 7 is a fragmentary sectional view showing how the clips function in holding the cover down onto the running board;

Figs. 8, 9, 10, 11, and 12 are views looking at the under side of the cover and illustrating various ways of reenforcing and fastening the cover to the running board; and Fig. 13 is a detail sectional view substantially along the line 13—13 of Fig. 12.

Referring now to the drawings and first to Figs. 1, 2, 3, and 4, 15 represents the running board body which is generally formed of sheet metal and in this instance is curved downwardly at the front (see Figs. 2 and 3), and is flanged downwardly at its ends so that the latter can be readily secured to the rear fender 16 and the front fender 17 (see Fig. 1). The rear edge of the board is in this instance curved upwardly and forms part of the splash pan 18. The board may be curved lengthwise to conform to curvatures in the adjacent parts of the automobile body, such as the fenders. In this instance, the cover extends over the whole area of the running board and a portion of the front fender 17, the cover being quite flexible throughout so that it can be made to conform to all the curvatures of the board and adjoining portions of the fender 17. This cover consists chiefly of a sheet 19 of soft rubber the upper surface of which may be ribbed or given any other desired configuration. While the cover is described as being made of rubber, other materials originally in plastic state may be used provided they have the desired flexibility, appearance, and wearing qualities, and otherwise answer the necessary requirements. Soft rubber, however, produces the best results and at the present time is preferred.

The cover is fastened mechanically to the top and curved front of the running board and also to the front fender 17, the present invention relating particularly to the details of the means for fastening it in place.

In the form of the invention shown in Fig. 2, the rubber layer 19 of the cover has embedded in the lower side thereof one or more continuous longitudinally extending thin metal strips 20 which are located inwardly somewhat from the longitudinal edges of the rubber since the edge portions are held to the running board in a somewhat different manner than the remaining portions of the cover. As stated above, one or more of these longitudinally extending strips may be employed, but, in any event, they are embedded in the lower part of the rubber so as to be flush with the lower surface thereof. Each of these strips 20 is slotted to receive the clips or mechanical fasteners 21. These clips are formed from sheet metal, and, in the preferred construction of the clip (note Fig. 5) the clip is provided with a head portion 21ᵃ formed by doubling the metal upon itself and with a shank 21ᵇ formed of two thicknesses of metal, the shank having a lateral extension 21ᶜ the upper edge of which is inclined as shown at 21ᵈ. The head of the clip is embedded in the rubber next to the strip and the shank extends through a slot in strip 20 and projects downwardly from the bottom of the cover.

The running board will be provided with elongated slots properly located to receive the shanks of the clips extending from the bottom of the cover, as will also the portion of the fender 17 whenever the rubber is extended up over the fender, and after these clips are extended through the slots in the running board or other member over which the cover is to extend, the shanks are twisted so as to pull the cover down tightly onto the part or parts beneath.

In Fig. 6 the clips are shown before the cover is applied to the running board, and Fig. 7 shows the clips after the cover has been applied to the board and the shanks have been twisted to pull the cover down onto the board.

It will be noted in this instance and as has already been pointed out that the longitudinally extending strips 20 are set in somewhat from the longitudinal edges of the cover. To hold the edge portions of the cover against the board, I employ a binding strip or bead 22 which is secured to the running board and held thereon by bolts 23 or otherwise and overlaps the adjoining edge portion of the cover so as to hold it down against the board. This bead or binding strip extends all around the cover and holds the cover in place at its edges and entirely around it. Thus it will be seen that at its edges the cover is held in place by the bead which engages it continuously around its margin, and inside of its margin it is held in place by the embedded strips with the clips extending therethrough and extending also through the running board so as to draw the cover down tightly against the board as well as against that portion of the fender 17 which is overlapped by the cover.

A cover of this kind is flexible throughout and readily conforms to the curves of the part or parts which it is to cover. If desired, the cover may be molded flat, or, if one portion, such as the front portion, is to extend down over a considerable portion of the curved front of the running board, the cover may be preformed on a curve, as shown at 19ᵃ in Fig. 6, to insure a smooth, tight fit of this portion of the cover over the corresponding portion of the running board.

The reenforcement and fastening means of the cover previously described may be modified considerably. I have already pointed out that the number of strips which extend longitudinally through the lower side of the cover may be modified as desired. In Figs. 8 to 12 I have shown various modifications, these views showing the under sides of the different modified covers.

In Fig. 8, the cover, here designated 19ᵇ, has a single longitudinal strip 20ᵇ extending substantially centrally through the same. In Fig. 9 the cover 19ᶜ has two strips 20ᶜ embedded therein, these being arranged substantially as shown by dotted lines in Fig. 1. In Fig. 10 the cover 19ᵈ has three strips 20ᵈ embedded therein, one extending substantially centrally through the bottom portion of the cover and the others along the front and rear margins. In Fig. 11 the cover 19ᵉ has three longitudinally extending strips 20ᵉ, and at the ends of the cover (one end only being shown) these strips are joined by a transverse strip 20ᶠ. All these strips, regardless of their number and arrangement, are associated with clips 21 which are arranged as before and have their shank portions extending through the strips in the manner and for the purpose previously described.

It will be understood that with the covers shown in Figs. 8 and 9 a binding strip such as illustrated in Figs. 1 and 2 may be used to hold down the edge portions of the strip, and that with the strips arranged as in Figs. 10 and 11 the clips alone may be relied on to hold down the cover, but even with these covers a binding strip or bead may be employed to hold down the cover at its edges. In a cover such as illustrated in Figs. 8 or 9, wherein the margin is more or less free of strips and clips and is designed to be held down to the board by a binding strip, there may in some instances be even more than three of the isolated inwardly located strips with their clips.

In all the instances previously mentioned wherein one or more reenforcing and fastening strips are embedded in the rubber, there may be substituted for the strips isolated anchorage plates 24 (see Figs. 12 and 13) which will be located where desired and will be embedded in the lower side of the rubber so that their lower faces will be flush with the lower face of the rubber, as clearly indicated in Figs. 12 and 13. Each of these anchorage plates 24 has a slot to accommodate the shank of one of the fastening clips 21, the head of the clip being embedded in the rubber the same as before. The isolated anchorage plates and the clips perform the function of the continuous strips with their associated clips but render the cover somewhat more flexible. Where the isolated anchorage plates and clips are employed, it is important that the slots in the anchorage plates and the elongated shanks of the clips extend longitudinally of the board with the grain of the rubber since the shrinkage occurs principally in the direction of the grain of the rubber. By having the slots in the running board arranged lengthwise thereof to conform to the direction of the slots and the clip shanks on the cover and by having these slots in the running board somewhat longer than necessary to receive the shanks, the cover will always fit down closely onto the board in the intended manner since in this way variations in shrinkage will be compensated for.

While the covers are intended primarily for use in connection with running boards of automobiles, they may be employed with other tread members.

While I have shown the preferred embodiment and some modifications, I do not desire to be confined to the precise details shown but aim in my claims to cover all modifications which do not involve a departure from the spirit and scope of the invention in its broadest aspects.

Having thus described my invention, I claim:

1. The combination with an automobile running board and adjoining fender, of a rubber cover for the running board having a portion overlapping a portion of the fender, a binding strip extending around the cover secured to the running board and fender in overlapping relationship with the cover, and said cover having inside its margin a plurality of clips embedded in the lower portion of the cover and having shank portions extending through the lower portion of the cover and through openings in the running board and fender whereby the cover is held in place on the running board and fender along its margin and inwardly thereof.

2. The combination with the running board of an automobile and a fender attached to the running board, of a cover consisting of a rubber sheet covering substantially the entire area of the board and overlapping a portion of the fender, a binding strip secured to the running board and fender and extending around the same in overlapping relation with the edge portion of the rubber sheet, and one or more reenforcing strips embedded in the lower side of the rubber inwardly of the longitudinal margins of the cover and having clips extending therethrough and through the bottom of the sheet and extending through and in locked engagement with the running board and the fender.

3. The combination with an automobile running board and adjoining fender, of a cover for the running board comprising a sheet of rubber having a portion thereof overlapping a portion of the fender, and one or more reenforcing strips embedded in the sheet of rubber and extending into the overlapping portion thereof.

4. The combination with an automobile running board and adjoining fender, of a cover for the running board comprising a sheet of rubber having a portion thereof overlapping a portion of the fender, and one or more reenforcing strips embedded in the sheet of rubber substantially flush with the lower face thereof and extending into said overlapping portion.

5. The combination with an automobile running board and adjoining fender, of a cover comprising a sheet of rubber extending over the running board and having a portion overlapping a portion of the fender, and a metal reenforcement embedded in the rubber sheet and extending into said overlapping portion.

6. A flexible cover for running boards and the like comprising a sheet of rubber having a plurality of flexible strips each isolated or independent of the other or others embedded in the rubber with the lower sides of the strips substantially flush with the lower side of the rubber, and fastening clips also embedded in the rubber next to the strips and having shank portions extending through the strips below the lower side of the cover.

7. In combination with an elongated metal running board body of tapering width, a cover adapted to be applied to said body comprising an elongated sheet of rubber of corresponding tapering width having isolated metal reinforcing strips embedded therein and extending longitudinally of the cover in diverging relation.

8. In combination with an elongated metal running board body of tapering width, a cover adapted to be applied to said body comprising an elongated sheet of rubber of corresponding tapering width having isolated metal reinforcing strips embedded therein and extending longitudinally of the cover in diverging relation, and also having mechanical fasteners extending through the strips and projecting from the underside of the cover for connection with the running board body.

CHARLES H. GETZ.